(12) United States Patent
Jang et al.

(10) Patent No.: US 9,513,802 B2
(45) Date of Patent: Dec. 6, 2016

(54) METHODS FOR DISPLAYING A USER INTERFACE ON A REMOTE CONTROL DEVICE AND A REMOTE CONTROL DEVICE APPLYING THE SAME

(75) Inventors: Ju-yun Jang, Suwon-si (KR);
Sung-Hee Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 448 days.

(21) Appl. No.: 13/244,323

(22) Filed: Sep. 24, 2011

(65) Prior Publication Data

US 2012/0089940 A1 Apr. 12, 2012

(30) Foreign Application Priority Data

Oct. 6, 2010 (KR) .......................... 10-2010-0097390

(51) Int. Cl.
| | |
|---|---|
| *G06F 3/00* | (2006.01) |
| *G06F 3/0488* | (2013.01) |
| *G06F 3/0482* | (2013.01) |
| *G06F 9/44* | (2006.01) |
| *H04N 21/422* | (2011.01) |

(52) U.S. Cl.
CPC ......... *G06F 3/04886* (2013.01); *G06F 3/0482* (2013.01); *G06F 9/4445* (2013.01); *H04N 21/4221* (2013.01); *H04N 21/42207* (2013.01); *H04N 21/42224* (2013.01)

(58) Field of Classification Search
CPC G06F 3/0481; G06F 3/04812; G06F 3/04847; G06F 3/0488; G06F 3/0485; G06F 3/0482; G06F 8/24; G06F 8/38; G06F 3/04886; G06F 9/4445; H04N 21/422207; H04N 21/4221; H04N 21/42224

USPC ................ 715/234, 243, 254, 255, 784, 862
See application file for complete search history.

(56) References Cited

U.S. PATENT DOCUMENTS

| | | | |
|---|---|---|---|
| 7,688,379 B2 * | 3/2010 | Forman et al. | ................ 348/356 |
| 8,150,939 B1 * | 4/2012 | Murray | ............. G06F 17/30896 709/203 |
| 2003/0088875 A1 * | 5/2003 | Gay | ........................ H04N 5/765 725/88 |
| 2004/0183756 A1 | 9/2004 | Freitas et al. | |
| 2007/0265954 A1 * | 11/2007 | Mather et al. | ................... 705/37 |

(Continued)

FOREIGN PATENT DOCUMENTS

| | | | |
|---|---|---|---|
| KR | 1020020062651 A | 7/2002 | |
| KR | 10-2010-0097390 | * 10/2010 | ............... H04Q 9/04 |

OTHER PUBLICATIONS

Communication dated Mar. 31, 2015, issued by the European Patent Office in counterpart European Application No. 11182952.9.

(Continued)

*Primary Examiner* — Kyle Stork
(74) *Attorney, Agent, or Firm* — Sughrue Mion, PLLC (57) ABSTRACT

A method for displaying a user interface (UI) of a display apparatus on a remote control and a remote control applying the same are provided. The remote control includes a controlling unit which identifies information regarding a UI where a cursor is located on a screen of the display apparatus, and a display unit, such as a touch screen, which displays an image corresponding to the identified UI information. Accordingly, a user may remotely control the display apparatus more intuitively and delicately using the touch screen display unit on the remote control.

27 Claims, 7 Drawing Sheets

(56) References Cited

U.S. PATENT DOCUMENTS

| | | | |
|---|---|---|---|
| 2008/0168391 A1* | 7/2008 | Robbin | G06F 17/30194 |
| | | | 715/810 |
| 2009/0174653 A1 | 7/2009 | Shin et al. | |
| 2009/0249359 A1* | 10/2009 | Caunter et al. | 719/315 |
| 2010/0017372 A1 | 1/2010 | Park et al. | |
| 2011/0047033 A1* | 2/2011 | Mahaffey | G06Q 30/0269 |
| | | | 705/14.66 |
| 2012/0092253 A1* | 4/2012 | Irani et al. | 345/157 |
| 2013/0125052 A1* | 5/2013 | Baird | G06F 3/0482 |
| | | | 715/810 |

OTHER PUBLICATIONS

Communication dated Mar. 14, 2016, issued by the Korean Intellectual Property Office in counterpart Korean Application No. 10-2010-0097390.

* cited by examiner

METHODS FOR DISPLAYING A USER INTERFACE ON A REMOTE CONTROL DEVICE AND A REMOTE CONTROL DEVICE APPLYING THE SAME

CROSS-REFERENCE TO RELATED APPLICATIONS

This application claims priority from Korean Patent Application No. 2010-0097390, filed in the Korean Intellectual Property Office on Oct. 6, 2010, the disclosure of which is incorporated herein by reference.

BACKGROUND

1. Field

Apparatuses and methods consistent with embodiments relate generally to a method for displaying a User Interface (UI) in a remote control and a remote control applying the same, and more particularly, to a method for displaying a UI in a remote control having a touch screen treads o facilitate input operation and a remote control applying the same.

2. Description of the Prior Art

The main function of a conventional display apparatus is to display an image for a user. However, in recent years, a display apparatus such as a digital television has been widely used, which not only displays an image but also provides various functions. For example, a user may make a video call and connect to the Internet through a display apparatus.

With the development of such a display apparatus, a remote control to control the display apparatus remotely has also been developed in various ways, including the introduction of a remote control having a touch screen instead of buttons.

For a remote control having a touch pad, if a user touches and moves the touch pad, a cursor on a display apparatus also moves in the same direction and makes a selection. With a touch pad, the remote control does not have a screen function.

The remote control having a touch pad is similar to a mouse for a computer in that both apparatuses are capable of performing operation intuitively. However, with a touch pad, a user may not perform manipulation accurately nor move a cursor intuitively.

Meanwhile, a remote control having a touch screen function has also been introduced. That is, the screen of a display apparatus is also displayed on the touch screen of the remote control and thus, a user may watch the screen on the remote control and move a cursor on the screen intuitively.

However, when the user performs an input operation on the remote control with a touch screen function, the user should perform the input operation while checking both the screen of the display apparatus and the touch screen of the remote control in turn, which may cause inconvenience to the user. In addition, it is difficult for the user to perform manipulation accurately since the size of the display unit of the display apparatus is different from the size of the screen of the remote control.

As a complex multimedia apparatus such as a digital television is continuously being developed, a remote control to control such a complex multimedia apparatus should also be developed. Therefore, a method for addressing the above problems is required.

SUMMARY

One or more exemplary embodiments provide a method for displaying a user interface (UI) to facilitate a user's manipulation of a remote control with a touch screen, and a remote control applying the same.

According to one exemplary embodiment, a remote control device controlling a display apparatus, includes a controlling unit which identifies information regarding a user interface (UI) where a cursor is located on a screen of the display apparatus, and a display unit which displays an image corresponding to the identified UI information.

The UI information may be information regarding a widget displayed in an area where the cursor is located, and the widget may be one of a list widget, an edit box widget, a slide-bar widget, a button widget, a drop-down widget, and a scroll widget.

The UI information may be identification (ID) information identifying a UI on the screen of the display apparatus.

The display unit may display a plurality of lines including a text or a drawing when the area where the cursor is located is identified as a list widget, and the plurality of lines may be based on list information input to the remote control device from the display apparatus.

The display unit may display a text input window for inputting a text when the area where the cursor is located is identified as an edit box widget.

The display unit may display a slide bar which is movable in a vertical direction or a horizontal direction when the area where a cursor is located is identified as a slide-bar widget.

The display unit may display a UI including at least one depressible button when the area where a cursor is located is identified as a button widget.

The display unit may display a drop-down menu when the area where a cursor is located is identified as a drop-down widget, and the drop-down menu may be displayed in a form of a list if a user's input is received at the remote control device.

The display unit may display a UI including a scroll bar which is movable in a vertical direction or a horizontal direction when the area where a cursor is located is identified as a scroll widget.

The display unit may be a touch screen.

The remote control device may further include a receiving unit which receives the identified UI information from the display apparatus and a storage unit which stores image information corresponding to the identified UI information, and the controlling unit may receive UI information from the receiving unit, read out image information corresponding to the received UI information from the storage unit, and provide the image information to the display unit.

In another exemplary embodiment, a method for displaying a user interface (UI) on a remote control device which controls a display apparatus remotely includes: identifying UI information displayed in an area of a display apparatus where a cursor is located on a screen of the display apparatus, and displaying an image corresponding to the identified UI information on a screen of the remote control device.

The UI information may be information regarding a widget displayed in an area where the cursor is located, and the widget may be one of a list widget, an edit box widget, a slide-bar widget, a button widget, a drop-down widget, and a scroll widget.

The UI information may be identifying (ID) information identifying a UI on the screen of the display apparatus.

The displaying may include displaying a plurality of lines including a text or a drawing when the area where the cursor is located is identified as a list widget, wherein the plurality of lines is based on list information input from the display apparatus.

The displaying may include displaying a text input window for inputting a text when the area where the cursor is located is identified as an edit box widget.

The displaying may include displaying a slide bar which is movable in a vertical direction or a horizontal direction when the area where a cursor is located is identified as a slide-bar widget.

The displaying may include displaying a UI including at least one depressible button when the area where a cursor is located is identified as a button widget.

The displaying may include displaying a drop-down menu when the area where a cursor is located is identified as a drop-down widget, and wherein the drop-down menu is displayed in a form of a list if a user's input is received at the remote control device.

The displaying may include displaying a UI including a scroll bar which is movable in a vertical direction or a horizontal direction when the area where a cursor is located is identified as a scroll widget.

In one aspect of an exemplary embodiment, the method may further include receiving the identified UI information from the display apparatus and storing image information corresponding to the identified UI information, and the identifying may include reading out image information corresponding to the received UI information, and the displaying may include displaying the image information.

The identifying may include identifying the UI information only if the cursor does not move on the screen of the display apparatus for a predetermined period of time.

In another exemplary embodiment, a method for controlling a display apparatus with a remote control device comprises: identifying content on a display apparatus corresponding to a position of a cursor; displaying the identified content on a touch screen display of a remote control device; receiving a user input on the remote control device relating to the identified content; and controlling the display apparatus based on the received user input.

The content may be a user interface on the display apparatus.

The user input may be received on the touch screen display of the remote control device.

The vertical direction may be an up direction or a down direction, and the horizontal direction may be a left direction or a right direction.

BRIEF DESCRIPTION OF THE DRAWINGS

The above and/or other aspects will be more apparent from the following detailed description of exemplary embodiments, taken in conjunction with the accompanying drawings, in which.

DETAILED DESCRIPTION

Certain exemplary embodiments are described in further detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically-defined matters. Also, well-known functions or constructions are not described in detail since they would obscure the application with unnecessary detail.

Figure 1:
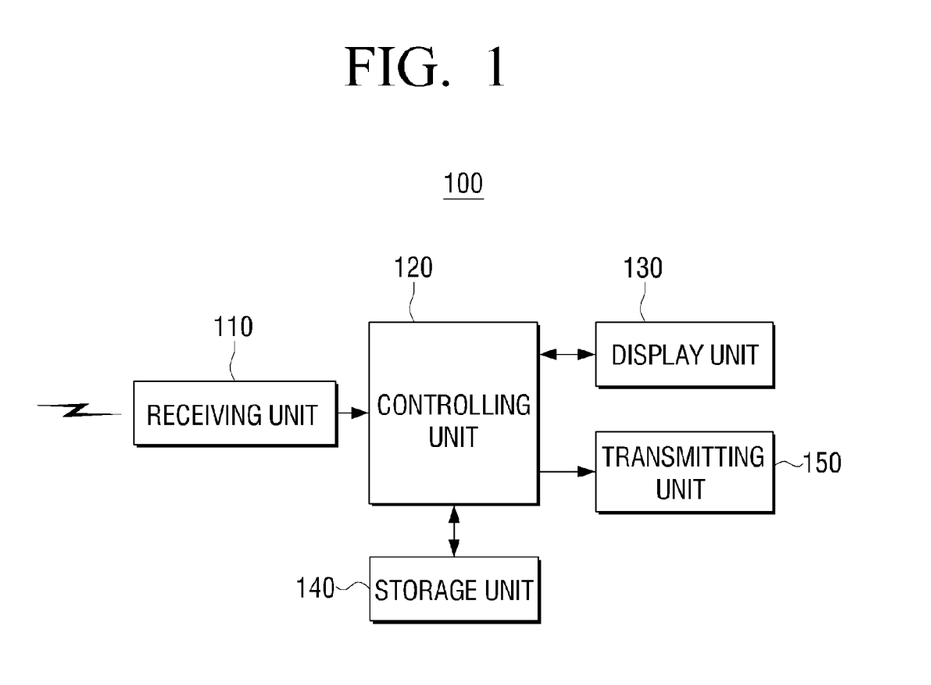
FIG. 1 is a block diagram illustrating the configuration of a remote control, according to an exemplary embodiment.

FIG. 1 is a block diagram illustrating the configuration of a remote control 100 according to an exemplary embodiment. The remote control 100 according to an exemplary embodiment comprises a receiving unit 110, a controlling unit 120, a display unit 130, a storage unit 140, and a transmitting unit 150.

The receiving unit 110 receives various information from a display apparatus (not shown). In particular, the receiving unit 110 receives information regarding at least one user interface (UI) displayed on a screen of the display apparatus, and specifically information regarding a UI where a cursor on the screen is located, which will be explained later. That is, the cursor on the screen of the display apparatus moves as the remote control 100 is manipulated, and if the cursor on at least one UI on the display apparatus is moved, the display apparatus transmits information to the remote control 100 that the cursor is located on that specific UI. Accordingly, the remote control 100 may identify the UI on which the cursor is located on the screen of the display apparatus based on the received UI information.

Herein, the UI information displayed on the screen of the display apparatus may be identification (ID) information for identifying a UI on the screen of the display apparatus, and if a UI is a widget, the UI information may be widget information.

Specifically, in order to identify a UI where a cursor is located, the remote control 100 may transmit a UI information request message to the display apparatus through the transmitting unit 150, which will be explained later, and the display apparatus may transmit a reply message in response to the request message back to the remote control 100. This operation may be performed through infrared-rays (IR) communication or Radio Frequency (RF) communication, and may be derived easily by those skilled in the related art using wireless transmission technology.

The controlling unit 120 controls overall operation of the remote control 100. The controlling unit 120 may control the operation of the display apparatus according to a user's command input to the remote control 100 from a user. The controlling unit 120 may control basic operations of the display apparatus, such as changing channels, changing volume, switching a screen, setting user definition, turning the screen on and off, and so on. In the case of the remote control 100 according to an exemplary embodiment, a touch screen is an input means and thus, the display unit 130 may be a touch screen and serve as an input means.

In addition, the controlling unit 120 may control the transmitting unit 150 to request information regarding a UI where a cursor is located on the screen of the display apparatus. The transmitting unit 150 will be explained later. The display apparatus transmits a reply message to the remote control 100 in response to the request message, and the receiving unit 110 receives the reply message from the display apparatus.

The controlling unit 120 receives the reply message received by the receiving unit 110 and identifies information regarding a UI where a cursor is located on the screen of the display apparatus. Identifying information regarding a UI may include information on whether a UI is a widget; identifying the type of the widget; and if a UI is not a widget, identifying the function of the UI. Herein, if a UI is not a widget, the UI may be a UI for inputting a text; a UI for manipulating a screen, such as switching a screen; or a UI for inputting a user's command.

Meanwhile, the controlling unit 120 may identify UI information only when a cursor does not move for a predetermined period of time. This prevents identification of unnecessary UIs that the cursor may be located on only briefly while the cursor is moving around the screen.

If UI information is identified, the controlling unit 120 reads out an image corresponding to the UI information from the storage unit 140 and transmits the image to the display unit 130 so that the image can be displayed on the remote control 100.

The reply message received from the display apparatus, that is, the UI information, may include other information than the type of UI. For example, if a UI is a widget, particularly a list widget, the UI information may further include information included in the list, and if a UI is an edit box widget, the UI information may further include the type of text, that is, whether an input text is a character text or a number text, the length of text, and so on.

If a widget is a slide-bar widget (see FIG. 3C), the UI information may further include information regarding the scope of an area where the widget can move in a vertical, or up and down direction, or a horizontal, or left and right direction; and if a widget is a button widget (see FIG. 3D), the UI information may further include information regarding the number of depressible, or clickable, buttons. If a widget is a drop-down widget (see FIG. 3E), information regarding data which is displayed in a drop-down list when a user's click is input may be further included; and if a widget is a scroll widget (see FIG. 3F), information regarding the scope of an area where the widget can move in a vertical or horizontal direction may be further included.

The display unit 130 displays an image for remotely controlling the display apparatus according to the control of the controlling unit 120. Basically, a UI may include buttons for changing channels, changing volume, switching a screen, setting user definition, turning on/off of the screen, and so on. Meanwhile, the display unit 130 may display an image based on information received from the receiving unit 110; that is, information regarding a UI on the screen of the display apparatus where a cursor is located.

Figure 3A:
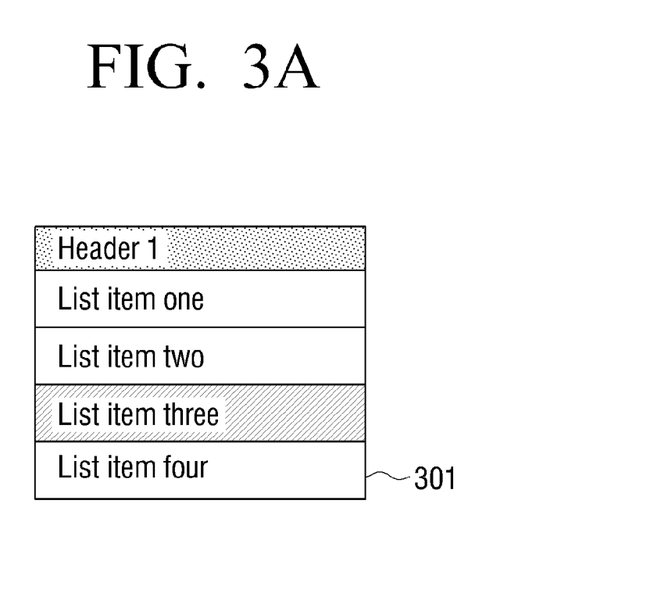
FIGS. 3A to 3F are illustrations of images corresponding to UI information received from a display apparatus, according to an exemplary embodiment.
Figure 3B:
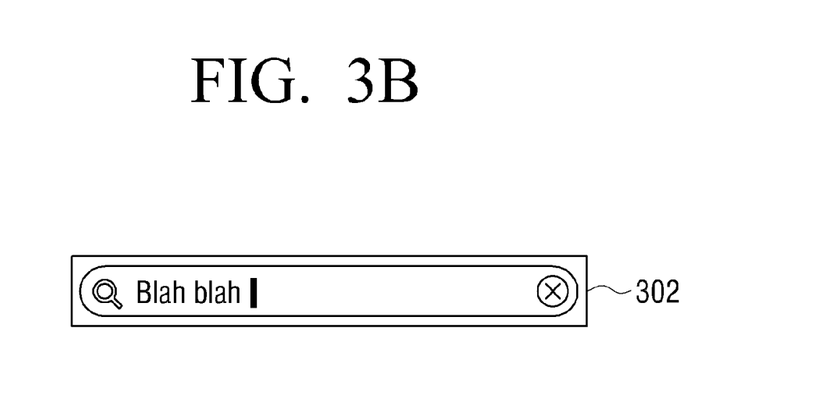

Specifically, if information regarding a UI where a cursor is located identifies the UI as a list widget, the display unit 130 may display a plurality of lines including a text and a drawing (see FIG. 3A); and if information regarding a UI where a cursor is located identifies the UI as an edit box widget, the display unit 130 may display an image including a text input window for inputting a text (see FIG. 3B).

Alternatively, if information regarding a UI where a cursor is located is identified as a slide-bar widget (see FIG. 3C), the display unit 130 may display a slide bar which can move up-down or left-right as a UI; and if information regarding a UI where a cursor is located is identified as a button widget (see FIG. 3D), the display unit 130 may display a UI including a clickable button. If information regarding a UI where a cursor is located is identified as a drop-down widget (see FIG. 3E), the display unit 130 may display data received from the display apparatus in a list when a user's click is input; and if information regarding a UI where a cursor is located is identified as a scroll widget (see FIG. 3F), the display unit 130 may display a UI including a scroll bar which can move in a vertical direction or horizontal direction.

In addition, the display unit 130 may be an input means which receives a user's command. Specifically, the display unit 130 may be a touch screen.

The storage unit 140 stores various data necessary to operate the remote control 100. In particular, with regard to changing channels, the storage unit 140 may temporarily store information regarding a channel before changing the channel, a preferred channel, and an image to display.

In addition, the storage unit 140 may store screen information corresponding to information regarding a UI where a cursor is located. Specifically, in the case of information regarding a UI where a cursor is located, the screen information may be information regarding the type of widget or ID information regarding the type of the UI. Meanwhile, if UI information indicates the type of widget, one of a list widget, an edit box widget, a slide-bar widget, a button widget, a drop-down widget, and a scroll widget may be identified. The storage unit 140 may store information regarding an image to be displayed on the display unit 130 corresponding to the type of widget. The image information may be stored in the form of a table.

The transmitting unit 150 transmits a signal to control the display apparatus. The signal may be an infrared (IR) signal or a radio frequency (RF) signal. However other signals may be used as long as wireless communication can be applied.

Figure 2A:
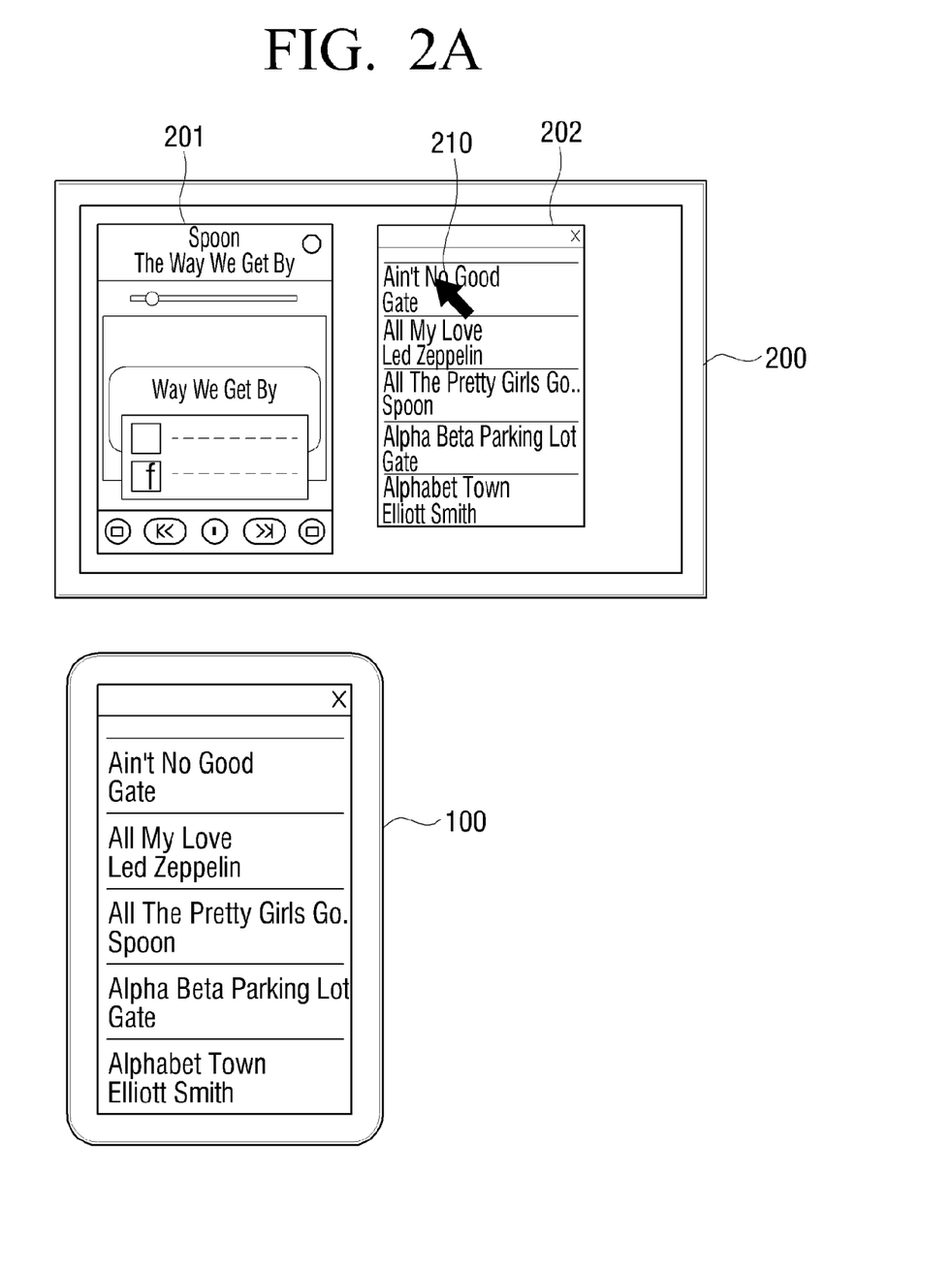
FIGS. 2A and 2B are illustrations of one or more operations on the remote control, according to an exemplary embodiment.
Figure 2B:
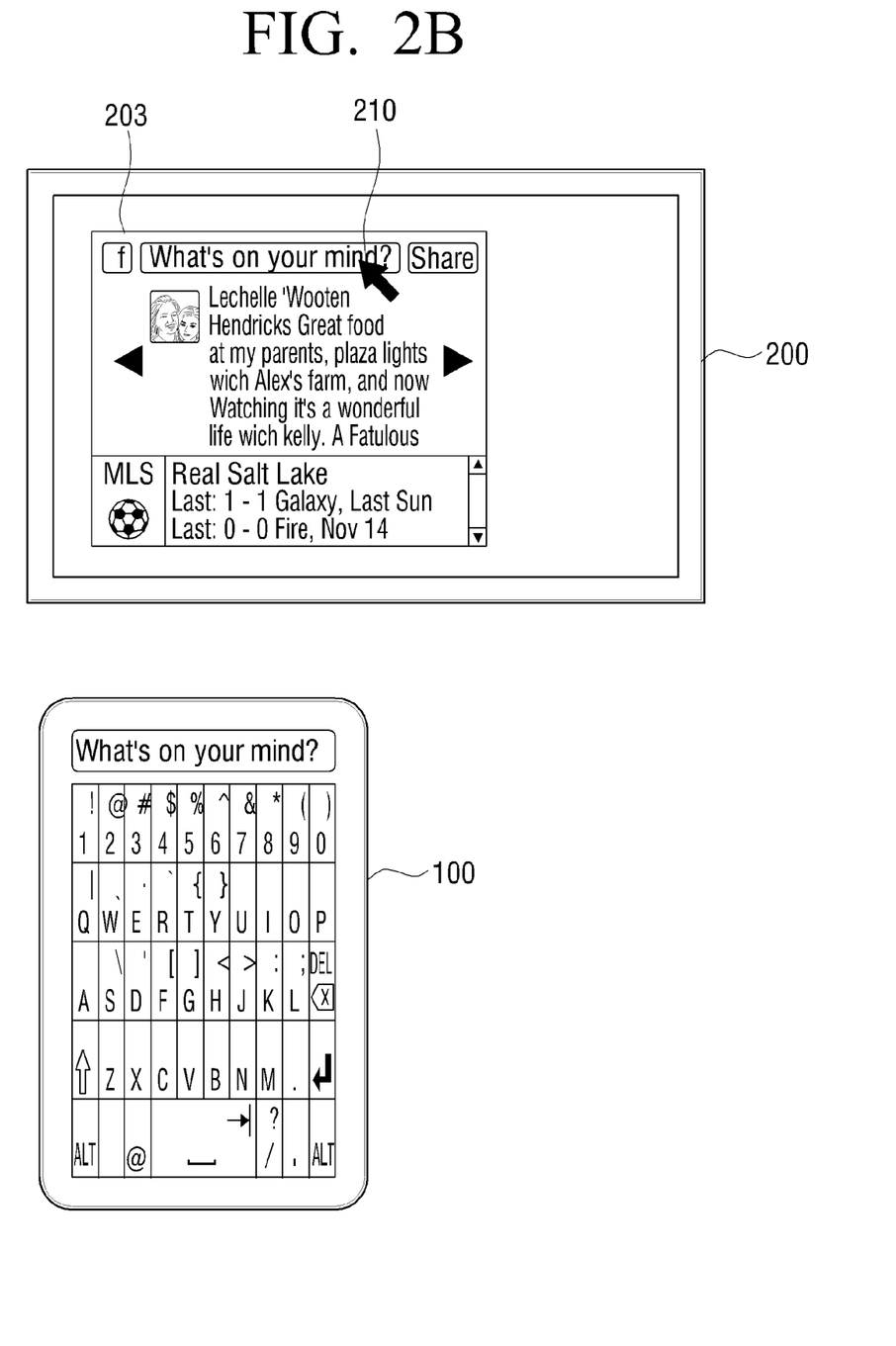

FIGS. 2A and 2B are illustrations of the operation of a remote control 100 according to an exemplary embodiment. In FIGS. 2A and 2B, the UI information received from a display apparatus 200 is assumed to be a list widget 202 and an edit box widget 201, respectively.

A user may move a cursor 210 on the screen of the display apparatus 200 by manipulating the remote control 100. The user may move the cursor 210 by moving the remote control 100 using a gravity sensor formed on the remote control 100 or by touching a touch screen formed on the remote control 100. However, other methods can be used to move the cursor of the display apparatus.

In FIG. 2A, a first UI 201 and a second UI 202 are displayed on the screen of the display apparatus 200. A user may move the cursor 210 on the screen of the display apparatus through the above-mentioned manipulation to either UI 201 or 202.

If a cursor is located on the second UI 202, that is, on a list widget, as illustrated in FIG. 2A, the remote control 100 displays an image corresponding to the list widget so that a user may select an item on the list. That is, as illustrated in FIG. 2A, a user may watch only a screen on the remote control 100 displaying the list widget 202 and manipulate the remote control 100 to select a specific item from the list, such as by interacting with a touch screen displaying an image corresponding to the list widget.

Specifically, if the cursor 210 is located on a specific UI on the screen of the display apparatus as a result of a manipulation by a user on the remote control 100, the display apparatus 200 transmits information regarding the UI where the cursor 210 is located to the remote control 100.

The remote control 100 reads out image information corresponding to the UI information from the storage unit 140 based on the UI information received from the display apparatus 200 and displays the image information on the display unit 130. In FIG. 2A, the image information corresponding to the list widget 202 is provided to a user on the remote control 100 so that the user may more easily input his or her selection.

Meanwhile, a user's cursor 210 may go through the first widget 201 and stop at the second widget 202. In this case, an image desired by the user who manipulates the remote control 100 is an image corresponding to the second widget 202 and thus, an image corresponding to the first widget 201 is not displayed.

Therefore, the remote control 100 may display an image corresponding to a specific UI only when the cursor stops at the specific screen corresponding to that specific UI for a predetermined period of time. In this case, the storage unit 140 of the remote control 100 may store information regarding the required predetermined period of time, which may be changed by a user.

In FIG. 2B, one UI 203 is displayed on the screen of the display apparatus 200. The UI 203 displayed on the display apparatus 200 is a UI for inputting a text. If a user manipulates the remote control 100 to locate the cursor 210 on the screen of the display apparatus 200 on the UI 203, the display apparatus 200 transmits information to the remote control 100 that the cursor 210 is located on the UI for inputting a text.

Based on the received UI information, the remote control 100 displays an image for inputting a text so that a user may easily input a text using only the remote control 100.

FIGS. 3A to 3F are illustrations of images which may be displayed on the remote control 100 in a method for displaying a UI, according to an exemplary embodiment. Specifically, FIGS. 3A to 3F illustrate images corresponding to UI information received from the display apparatus 200.

FIG. 3A illustrates a method of displaying a UI where a cursor on the display apparatus is located on a UI that is identified as a list widget. As illustrated in FIG. 3A, the remote control 100 displays a list 301, including a plurality of lines including a text or a drawing that is based on the received list information from the display apparatus. By displaying only the list 301 on the display unit 130 (not shown) of the remote control, a user may easily select specific data in the list 301 using only the display unit, so that the display apparatus does not need to be simultaneously viewed by the user.

FIG. 3B illustrates a method of displaying a UI where a cursor on the display apparatus is located on a UI that is identified as an edit box widget. As illustrated in FIG. 3B, the remote control 100 displays a UI including a text input window 302 for inputting a text.

Figure 3C:
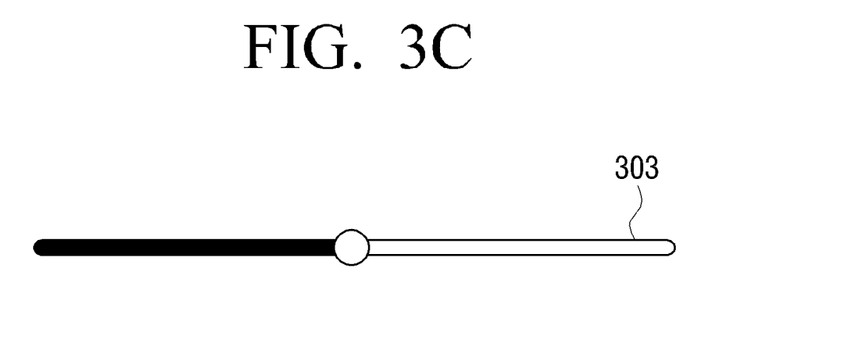

FIG. 3C illustrates a method of displaying a UI where a cursor on the display apparatus is located on a UI that is identified as a slide-bar widget. As illustrated in FIG. 3C, the remote control 100 displays a slide-bar 303 which is movable in a horizontal direction on the display unit 130 (not shown), although the slide-bar may also be moved in a vertical direction depending on the orientation of the slide-bar.

Figure 3D:
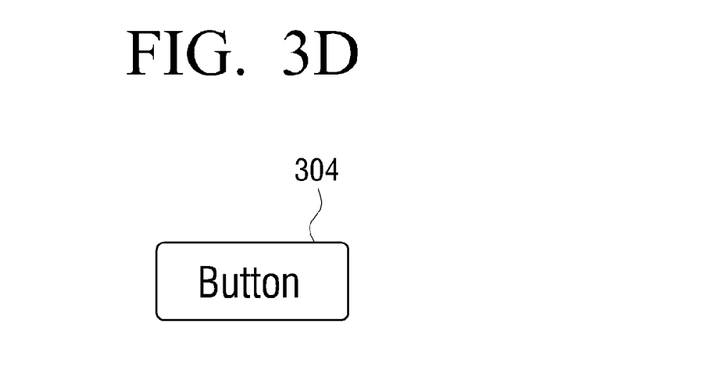

FIG. 3D illustrates a method of displaying a UI where a cursor on the display apparatus is located on a UI that is identified as a button widget. As illustrated in FIG. 3D, the remote control 100 may display a UI including at least one clickable button 304 on the display unit 130.

Figure 3E:
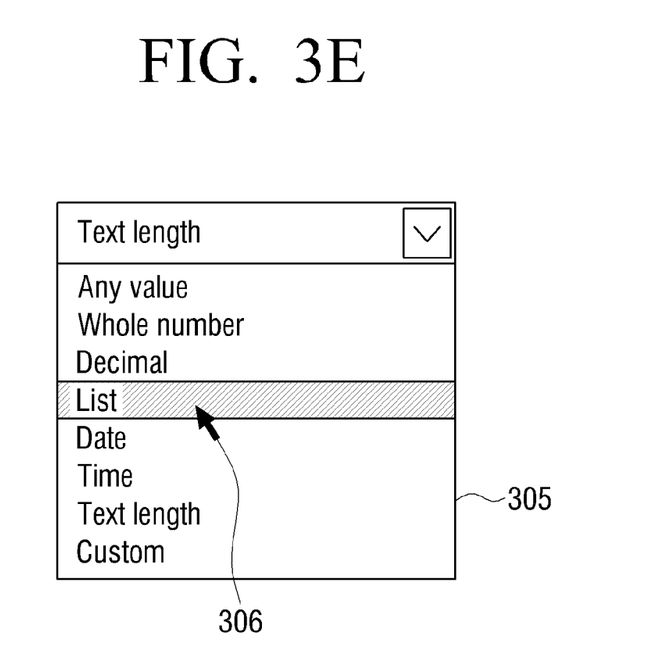

FIG. 3E illustrates a method of displaying a UI where a cursor on the display apparatus is located on a UI that is identified as a drop-down widget. As illustrated in FIG. 3E, the remote control 100 displays a drop-down list 305 on the display unit 130 based on data received from the display apparatus 200. As with a conventional drop-down list, the user may be required to click, touch or make some input on the drop down arrow 306 on the list 305 in order to show the entire list.

Figure 3F:
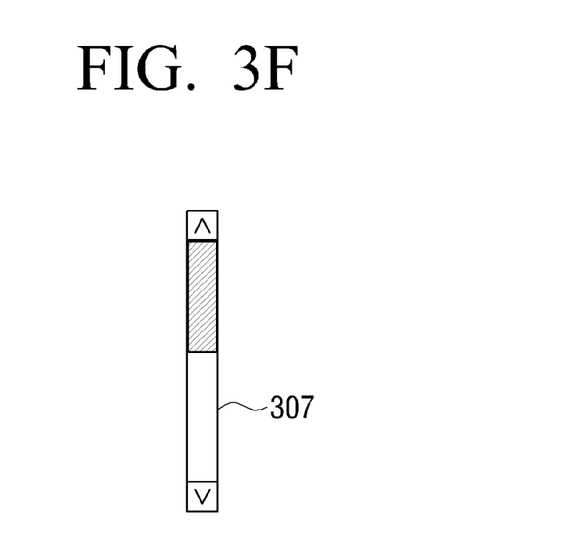

FIG. 3F illustrates a method of displaying a UI where a cursor on the display apparatus is located on a UI that is identified as a scroll widget. As illustrated in FIG. 3F, the remote control 100 may display a UI on the display unit 130 including a scroll bar 307 which is movable in a vertical direction, or, if oriented in a different direction, in a horizontal direction.

Figure 4:
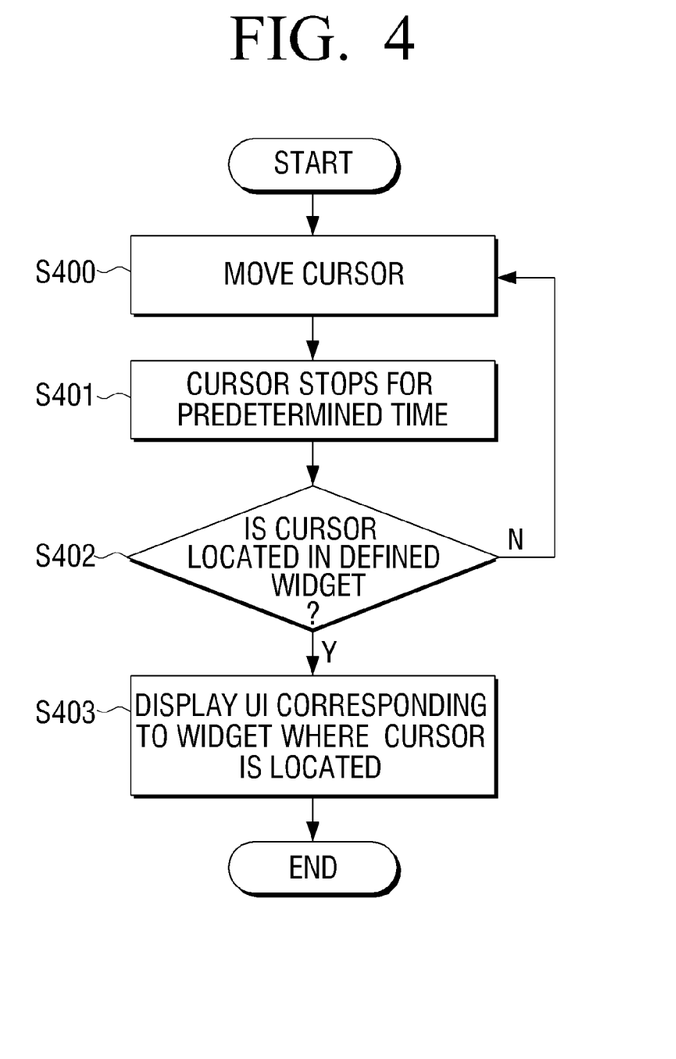
FIG. 4 is a flowchart illustrating the steps of displaying a UI on the remote control, according to an exemplary embodiment.

FIG. 4 is a flowchart illustrating the steps of displaying a UI, according to an exemplary embodiment. First of all, a cursor is moved on a screen of a display apparatus according to a manipulation by a user on a remote control 100 (S400). If the cursor stops at a specific location on the screen for a predetermined period of time (S401), a determination is made as to whether there is a widget in the area where the cursor is located (S402).

If there is no widget in the area where the cursor is located (S402-N), the cursor's movement is detected again (S400). If there is a widget in the area where the cursor is located (S402-Y), a UI corresponding to the widget is displayed on a display unit 130 of a remote control (S403).

Accordingly, a user may remotely control the display apparatus 200 more intuitively and delicately using the remote control 100 having a display unit such as a touch screen, where the display unit displays only one UI that can be easily viewed and manipulated by the user.

Although a few exemplary embodiments have been shown and described, it will be appreciated by those skilled in the art that changes may be made in these exemplary embodiments without departing from the principles and spirit of the invention, the scope of which is defined in the claims and their equivalents.

What is claimed is:
1. A remote control device for controlling a display apparatus configured to display content to a user, the display apparatus being external to the remote control device, the remote control device comprising:
a communication unit configured to communicate with the external display apparatus;
a display unit; and
a controlling unit configured to:
in response to receiving, from the external display apparatus via the communication unit, identification information of a widget that is selected on the external display apparatus and information on a first plurality of items included in the selected widget,
select a widget type corresponding to the received identification information among a plurality of widget types stored in the remote control;
generate a widget based on the selected widget type and the received information on the first plurality of items;
control the display unit to display the generated widget having a second plurality of items; and
in response to a user input selecting an item among the second plurality of items in the generated widget, control the communication unit to transmit information on the selected item to the external display apparatus.
2. The remote control device as claimed in claim 1, wherein
the widget type is one among a list widget, an edit box widget, a slide-bar widget, a button widget, a drop-down widget, and a scroll widget.

3. The remote control device as claimed in claim 1, wherein the controlling unit controls the display unit to display a text input window for inputting a text when the identification information indicates an edit box widget.

4. The remote control device as claimed in claim 1, wherein the controlling unit controls the display unit to display a slide bar movable in a vertical direction or a horizontal direction in response to an area on the external display apparatus where a cursor is located being identified as a slide-bar widget.

5. The remote control device as claimed in claim 1, wherein the controlling unit controls the display unit to display a user interface including at least one depressible button in response to an area on the external display apparatus where a cursor is located being identified as a button widget.

6. The remote control device as claimed in claim 1, wherein the controlling unit controls the display unit to display a drop-down menu in response to an area on the external display apparatus where a cursor is located being identified as a drop-down widget, and
the drop-down menu is displayed in a form of a list in response to a user input being received at the remote control device.

7. The remote control device as claimed in claim 1, wherein the controlling unit controls the display unit to display a user interface including a scroll bar movable in a vertical direction or a horizontal direction in response to an area on the external display apparatus where a cursor is located being identified as a scroll widget.

8. The remote control device as claimed in claim 1, wherein the display unit is a touch screen.

9. The remote control device as claimed in claim 1, further comprising a storage unit configured to store image information corresponding to the plurality of widget types,
wherein the controlling unit is further configured to generate the widget based on image information corresponding to the selected widget type.

10. The remote control device as claimed in claim 1, wherein the displayed widget is selected by a cursor displayed in an area of the displayed widget.

11. The remote control device as claimed in claim 1, wherein the controlling unit is further configured to control the communication unit to:
transmit a user manipulation that is received through the remote control device to the external display apparatus such that the cursor that is displayed on the external display apparatus is moved by the received user.

12. A method for displaying a user interface (UI) on a remote control device and controlling a display apparatus configured to display content to a user, the display apparatus being external to the remote control device, the method comprising:
in response to receiving, from the external display apparatus, identification information of a widget that is selected on the external display apparatus and information on a first plurality of items included in the selected widget, the selected widget being configured to receive a user input for selecting an item among the first plurality of items in the selected widget,
selecting a widget type corresponding to the received identification information among a plurality of widget types stored in the remote control device;
generate a widget based on the selected widget type and the received information on the first plurality of items;
displaying the generated widget having a second plurality of items; and
in response to a user input selecting an item among the second plurality of items in the generated widget, transmitting information on the selected item to the external display apparatus.

13. The method as claimed in claim 12, wherein
the widget type is one among a list widget, an edit box widget, a slide-bar widget, a button widget, a drop-down widget, and a scroll widget.

14. The method as claimed in claim 12, wherein the displaying comprises displaying a text input window for inputting a text when the identification information indicates an edit box widget.

15. The method as claimed in claim 12, wherein the displaying comprises displaying a slide bar movable in a vertical direction or a horizontal direction in response to an area on the external display apparatus where a cursor is located being identified as a slide-bar widget.

16. The method as claimed in claim 12, wherein the displaying comprises displaying a UI including at least one depressible button in response to an area on the external display apparatus where a cursor is located being identified as a button widget.

17. The method as claimed in claim 12, wherein the displaying comprises displaying a drop-down menu in response to an area on the external display apparatus where a cursor is located being identified as a drop-down widget, and
the drop-down menu is displayed in a form of a list in response to a user input being received at the remote control device.

18. The method as claimed in claim 12, wherein the displaying comprises displaying a UI including a scroll bar movable in a vertical direction or a horizontal direction in response to an area on the external display apparatus where the cursor is located being identified as a scroll widget.

19. The method as claimed in claim 12, further comprising:
storing image information corresponding to the plurality of widget types; and
wherein the generating comprises generating the widget based on image information corresponding to the selected widget type.

20. The method as claimed in claim 12, wherein the receiving comprises receiving the identification information only in response to a cursor not moving on the external display apparatus for a predetermined period of time.

21. A display apparatus comprising:
a communication unit configured to communicate with an external remote control device including a display;
a display unit configured to display content to the user;
a control unit configured to:
control the display unit to display a first widget;
in response to the first widget being selected on the display unit, transmit the identification information of the selected first widget and information on a first plurality of items included in the selected first widget to the external remote control device such that the external remote control device selects a widget type corresponding to the transmitted identification information among a plurality of widget types stored in the external remote control device, generate a widget based on the selected widget type and the received information on the first plurality of items and display the generated widget having a second plurality of items;
in response to a user input selecting an item among the second plurality of items in the generated widget, receive information on the selected item from the external remote control device, wherein the selected widget is configured to receive a user input for selecting an item among the first plurality of items in the selected widget.

22. The display apparatus as claimed in claim 21, wherein the first widget is displayed in an area where a cursor is located, and the first widget type is one among a list widget, an edit box widget, a slide-bar widget, a button widget, a drop-down widget, and a scroll widget.

23. The display apparatus as claimed in claim 21, wherein the communication unit is further configured to transmit a signal to control the display of the external remote control device to display a text input window for inputting a text when the identification information indicates an edit box widget.

24. The display apparatus as claimed in claim 21, wherein the communication unit is further configured to transmit a signal to control the display of the external remote control device to display a slide bar movable in a vertical direction or a horizontal direction when an area on the display unit where a cursor is located is identified as a slide-bar widget.

25. The display apparatus as claimed in claim 21, wherein the communication unit is further configured to transmit a signal to control the display of the external remote control device to display a user interface including at least one depressible button when an area on the display unit where a cursor is located is identified as a button widget.

26. The display apparatus as claimed in claim 21, wherein the communication unit is further configured to transmit a signal to control the display of the external remote control device to display a drop-down menu when an area on the display unit where a cursor is located is identified as a drop-down widget.

27. The display apparatus as claimed in claim 21, wherein the communication unit is further configured to transmit a signal to control the display of the external remote control device to display a user interface including a scroll bar movable in a vertical direction or a horizontal direction when an area on the display unit where the cursor is located is identified as a scroll widget.

* * * * *